(12) United States Patent
Kamaguchi et al.

(10) Patent No.: US 7,842,384 B2
(45) Date of Patent: Nov. 30, 2010

(54) HEAT RESISTANT CAPSULE AND PROCESS FOR PRODUCING THE SAME

(75) Inventors: Ryosei Kamaguchi, Osaka (JP); Takashi Shiomi, Osaka (JP)

(73) Assignee: Morishita Jintan Co., Ltd., Osaka (JP)

( * ) Notice: Subject to any disclaimer, the term of this patent is extended or adjusted under 35 U.S.C. 154(b) by 1243 days.

(21) Appl. No.: 10/565,911

(22) PCT Filed: Jul. 22, 2004

(86) PCT No.: PCT/JP2004/010762

§ 371 (c)(1), (2), (4) Date: May 3, 2006

(87) PCT Pub. No.: WO2005/011411

PCT Pub. Date: Feb. 10, 2005

(65) Prior Publication Data

US 2006/0286282 A1     Dec. 21, 2006

(30) Foreign Application Priority Data

Aug. 1, 2003   (JP) ............................. 2003-284952

(51) Int. Cl.
    *B32B 5/16*   (2006.01)
(52) U.S. Cl. .................................... 428/403
(58) Field of Classification Search .................. 428/403
    See application file for complete search history.

(56) References Cited

U.S. PATENT DOCUMENTS

| | | | |
|---|---|---|---|
| 4,695,466 A | | 9/1987 | Morishita et al. |
| 5,330,835 A | * | 7/1994 | Kikuchi et al. ......... 428/402.22 |
| 5,431,917 A | * | 7/1995 | Yamamoto et al. .......... 424/451 |
| 6,174,466 B1 | * | 1/2001 | Kiefer et al. .................. 264/4.4 |
| 6,251,661 B1 | | 6/2001 | Urabe et al. |

FOREIGN PATENT DOCUMENTS

| | | |
|---|---|---|
| JP | 58-22062 | 2/1983 |
| JP | 8-10313 | 1/1996 |
| JP | 2001-9267 | 1/2001 |
| JP | 2003-79351 | 3/2003 |
| JP | 2003-125714 | 5/2003 |

OTHER PUBLICATIONS

Kamaguchi et al., "Non-gelatinous Capsule Film Compositions and Capsules Formed Using the Same", May 30, 2003, International Application Published Under the PCT, WO 03/043609.*

* cited by examiner

*Primary Examiner*—Johann R Richter
*Assistant Examiner*—Ali Soroush
(74) *Attorney, Agent, or Firm*—Hamre, Schumann, Mueller & Larson, P.C.

(57) ABSTRACT

According to the present invention, there is provided a capsule comprising a capsule covering film and a capsule filler solution encapsulated therein, wherein curdlan is used as a capsule covering film matrix of this capsule covering film. This capsule is a capsule excellent in heat resistance, containing a non-protein-based capsule covering film matrix. The present invention also provides a process for producing this capsule.

9 Claims, 4 Drawing Sheets

HEAT RESISTANT CAPSULE AND PROCESS FOR PRODUCING THE SAME

TECHNICAL FIELD

The present invention relates to a capsule excellent in heat resistance, and a process for producing this capsule.

BACKGROUND TECHNIQUE

In recent years, health preference is being enhanced, and it is required that foods and drinks are taken and, at the same time, an active ingredient which enhances health can be ingested. For this reason, an attempt to add various active ingredients to foods or drinks has been tried. However, among these active ingredients, there are some having a peculiar smell, such as yeast. In addition, there are an active ingredient which deteriorates a taste of foods or the like when directly added to foods or drinks, and an active ingredient which is degraded or denatured by an ingredient contained in foods or the like, such as DHA (docosahexaenoic acid). In such the case, a method of encapsulating an active ingredient with being contained in a capsule filler solution, and adding this to foods or drinks is useful. As a covering film matrix for a capsule, gelatin is generally used frequently. Gelatin is prepared mainly from a bone, a cartilage, a skin and a tendon of an animal.

However, since gelatin is inferior in heat resistance, there is a disadvantage that when foods or drinks with a capsule added thereto are sterilized at an elevated temperature, a capsule covering film is dissolved, and a capsule filler solution is dissolved out into foods or drinks. Further, in recent years, since there is a tendency that a raw material derived from an animal is not preferred, use of a non-protein-based capsule covering film matrix which does not contain gelatin derived from an animal has been initiated to be desired. As the non-protein-based capsule covering film matrix, for example, agar and sodium alginate are known.

Although agar is an alga-processed product, and is not a raw material derived from an animal, it has not such the sufficient heat resistance that can endure the sterilizing condition at an elevated temperature of 80° C. or higher, and has a defect that it is inferior in processibility into foods or the like. In addition, since an agar gel is fragile, and is inferior in elasticity, a physical strength as a capsule covering film matrix is not sufficient.

A method of adding a divalent ion such as a calcium ion to enhance heat resistance of a capsule covering film in the case of using sodium alginate as a capsule covering film matrix is known. However, this method has a defect that heat resistance is not enhanced due to ion dissociation in the presence of a chelating agent and, for this reason, a kind of a capsule filler solution which can be used may be limited.

Japanese Patent Application Laid-Open (JP-A) No. 2003-79351 proposes a capsule for a drink excellent in heat resistance, containing gellan gum which is a polysaccharide, as a covering film component of a microcapsule. However, when a covering film is formed using gellan gum as a covering film component, an ion bond such as a calcium ion is accompanied as in formation of a covering film of the aforementioned sodium alginate. Therefore, there is a defect that, when a chelating agent having the ion dissociating activity is present, a heat resistant covering film cannot be formed. In addition, since gellan gum exhibits such the gel property that it has no elastic force and is fragile and easily ground like agar, gellan gum is suitable in block massy products such as jelly, but has a defect that a physical strength in the thin film state such as a capsule covering film is low, and gellan gum is easily disintegrated at preparation of a capsule, and a yield is deteriorated.

DISCLOSURE OF THE INVENTION

Technical Problem to be Solved by the Invention

The present invention is to solve the aforementioned previous problem, and an object thereof is to provide a capsule excellent in heat resistance, which contains a non-protein-based capsule covering film matrix, and a process for producing this capsule.

Method of Solving the Same

The present invention provides a heat resistant capsule, comprising a capsule covering film, and a capsule filler solution encapsulated therein, wherein curdlan is used as a capsule covering film matrix of this capsule covering film.

Also, the present invention provides a heat resistant capsule, characterized in that a capsule filler solution is encapsulated in a capsule covering film via a liquid substance for isolating the capsule filler solution and a capsule covering film, wherein curdlan is used as a capsule covering film matrix of this capsule covering film.

Herein, it is preferable that curdlan is contained at an amount of 80% by weight or more relative to a total weight of a capsule covering film matrix.

Further, the present invention provides a process for producing a heat resistant capsule, comprising using a first nozzle, a second nozzle and a third nozzle having a sequentially increasing radius, which are disposed concentrically, simultaneously extruding a capsule filler solution through the first nozzle, a capsule covering film solution through the second nozzle, and an oil solution through the third nozzle to form a composite jet, and releasing this composite jet into a heated oil solution, wherein this capsule covering film solution contains curdlan, and a temperature of an oil solution extruded through the third nozzle is lower than a temperature of the heated oil solution.

Herein, the "capsule covering film matrix" refers to a base which forms a capsule covering film, provided that the "capsule covering film matrix" referred therein does not include water contained in a capsule covering film. And, the "jet" refers to an extruded entity in which a liquid is continuously extruded, and the "composite jet" refers to a jet having a plurality of phases (layers).

Advantageous Effects Over Those of the Prior Art

By aforementioned means, a capsule excellent in heat resistance, containing a non-protein-based capsule covering film matrix can be provided. This capsule can be produced without using gelatin derived from an animal. The capsule of the present invention has further high heat resistance, and can endure dissolution or destruction of a capsule which can occur in heat treatment in a step of producing or cooking liquid foods such as drinks and the like, cooked processed foods such as retort foods and the like, and baked confectionary.

PROCESS LEADING TO THE INVENTION

First, a process leading to the present invention will be explained. In the capsule of the present invention, curdlan is used as a capsule covering film matrix. Curdlan is a polysaccharide derived from a microorganism (*Alcaligenes faecails myxogenes*), and is used for enhancing resilience of noodles, enhancing elasticity of marine paste product (e.g. boiled fish-paste), and improving eating feeling. Curdlan has two kinds of gel forming abilities of thermal reversible low set gel and thermal irreversible high set gel. A low set gel is a thermal reversible gel which is formed when a dispersion of curdlan in water is heated to about 55 to 65° C., and this is cooled to a normal temperature or lower, and is returned to the original dispersion state when heated to about 60° C. again. A high set gel is a thermal irreversible gel which is formed when a dispersion of curdlan in water is heated to about 80° C. or higher. A high set gel has an excellent nature that the gel is extremely stable to a change in a temperature.

In order to produce a capsule in which curdlan is used as a main component of a capsule covering film matrix, it is necessary to heat a capsule covering film containing curdlan to about 80° C. or higher to obtain a thermal irreversible gel. Herein, for producing such the capsule, a double nozzle is used, a capsule filler solution is extruded through an inner nozzle thereof, and a capsule covering film solution containing curdlan is extruded through an outer nozzle to form a composite jet and, when the jet is added dropwise to a heated oil solution, rapid gelling of curdlan at a nozzle part occurs. Thereby, choking is caused at a nozzle part, and a capsule filler solution and a capsule covering film solution cannot be extruded at a constant amount and, for this reason, a capsule cannot be produced. From these reasons, use of curdlan as a capsule covering film matrix is difficult, and a capsule in which curdlan is used as a main component of a capsule covering film matrix has not been produced.

Such the problem has been solved by the present invention, and it has become possible to produce a capsule in which curdlan is used as a main component of a capsule covering film matrix. That is, in the present invention, a new nozzle (outermost nozzle) is provided on a further outer side of an outer nozzle which extrudes a capsule covering film solution containing curdlan. By extruding an oil solution having a temperature lower than that of a heated oil solution through this outermost nozzle together with extrusion of the composite jet, rapid heating•gelling of curdlan at a nozzle part is alleviated. As a result, choking at a nozzle part is eliminated, and it has become possible to produce a capsule continuously.

BEST MODE FOR CARRYING OUT THE INVENTION

Figure 1:
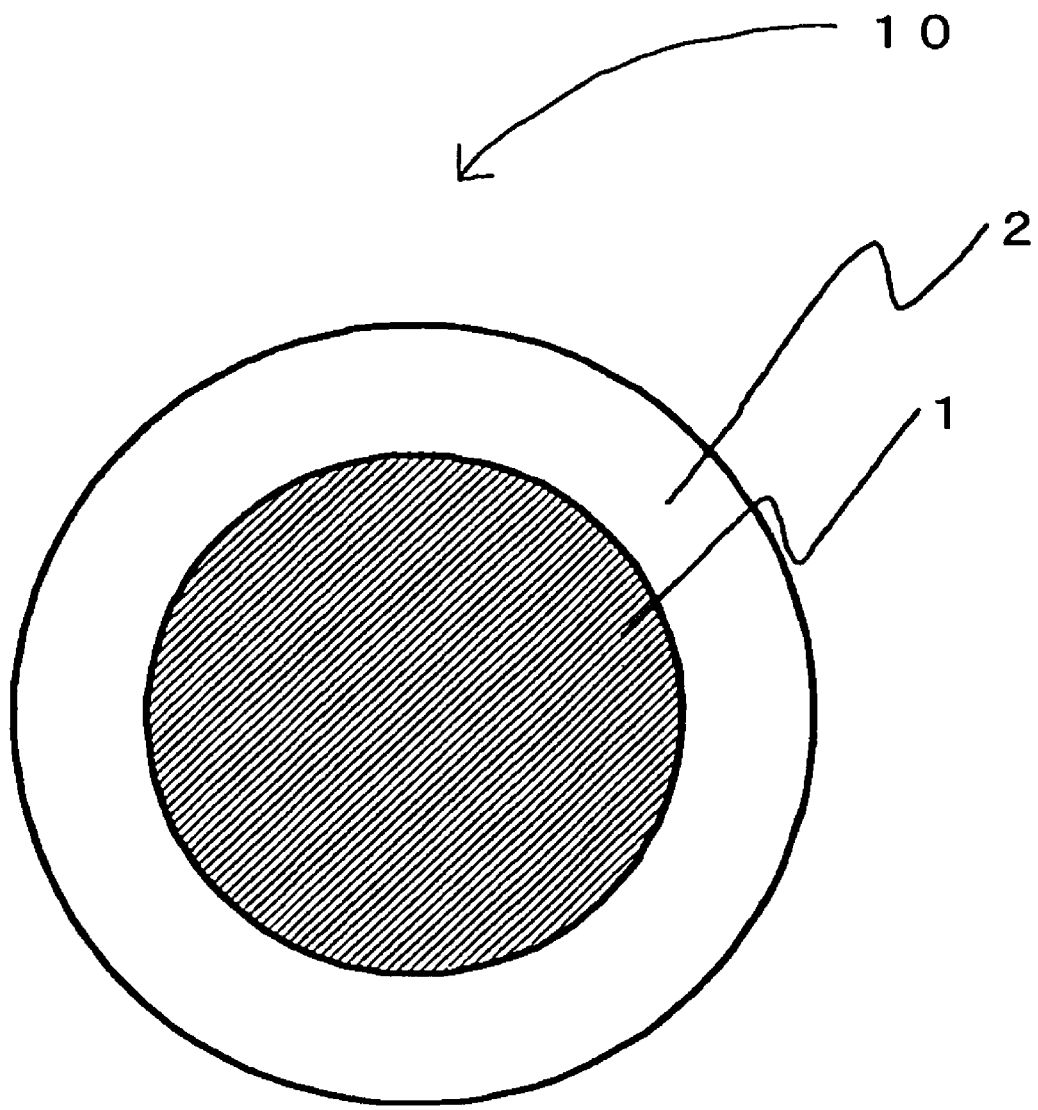
FIG. 1 is a schematic cross-sectional view of the capsule (bilayered structure) of the present invention.

The capsule (10) of the present invention shown in FIG. 1 consists of a capsule covering film (2) and a capsule filler solution (1) encapsulated therein. And, the capsule (20) of the present invention shown in FIG. 2 consists of a capsule filler solution (11), a liquid substance (12) for isolating a capsule filler solution and a capsule covering film, and a capsule covering film (3).

In the present invention, only curdlan may be contained as a capsule covering film matrix in a capsule covering film, or a capsule covering film matrix which is normally used in producing a capsule may be used together. Examples of such the covering film matrix include water-soluble polyhydric alcohols, polysaccharides, dextrin, starch and a derivative thereof. In addition, according to the present invention, it has become possible to provide a capsule containing a non-protein-based capsule covering film matrix, but use of a protein-based base as a capsule covering film matrix is not extruded, and it is also possible to produce a capsule excellent in heat resistance by using a protein-based base such as gelatin together.

Curdlan is contained in a capsule covering film matrix constituting a capsule covering film at 80% by weight or more, preferably 85 to 100% by weight, further 90 to 99.9% by weight. When curdlan is contained in a capsule covering film matrix at an amount less than 80% by weight, the resulting capsule has not the desired heat resistance or physical strength in some cases.

In addition, a capsule covering film in the present invention can further contain a viscosity adjusting agent described later. A covering film for a capsule in the present invention may further contain an additive such as tasting ingredients (sweeteners, acidulants or bitter tasting agents), plasticizer, antiseptics, pigments and perfumes.

A filler solution encapsulated in the capsule of the present invention is not particularly limited, but examples include lipophilic or hydrophilic liquid substances, suspensions of these liquid substances and powders insoluble therein, and a mixture of these liquid substances. These filler solutions may contain, for example, various lipophilic or hydrophilic active ingredients contained in normal functional foods or functional drinks, for example, various vitamins, minerals, perfumes, and extracts. Hydrophilic liquid substances include, for example, water (including purified water, ion-exchanged water etc.), water-soluble alcohols, polyhydric alcohols (glycerin, mannitol, sorbitol etc.) and a mixture thereof. Lipophilic liquid substances include glycerin fatty acid ester, sucrose fatty acid ester, medium chain fatty acid triglyceride (MCT), lauric acid, palmitic acid, stearic acid, myristic acid, oleic acid, behenic acid, vegetable fats or oils (palm oil, sunflower oil, safflower oil, sesame oil, rapeseed oil, grape seed oil, and mixture thereof) and a mixture thereof.

Figure 2:
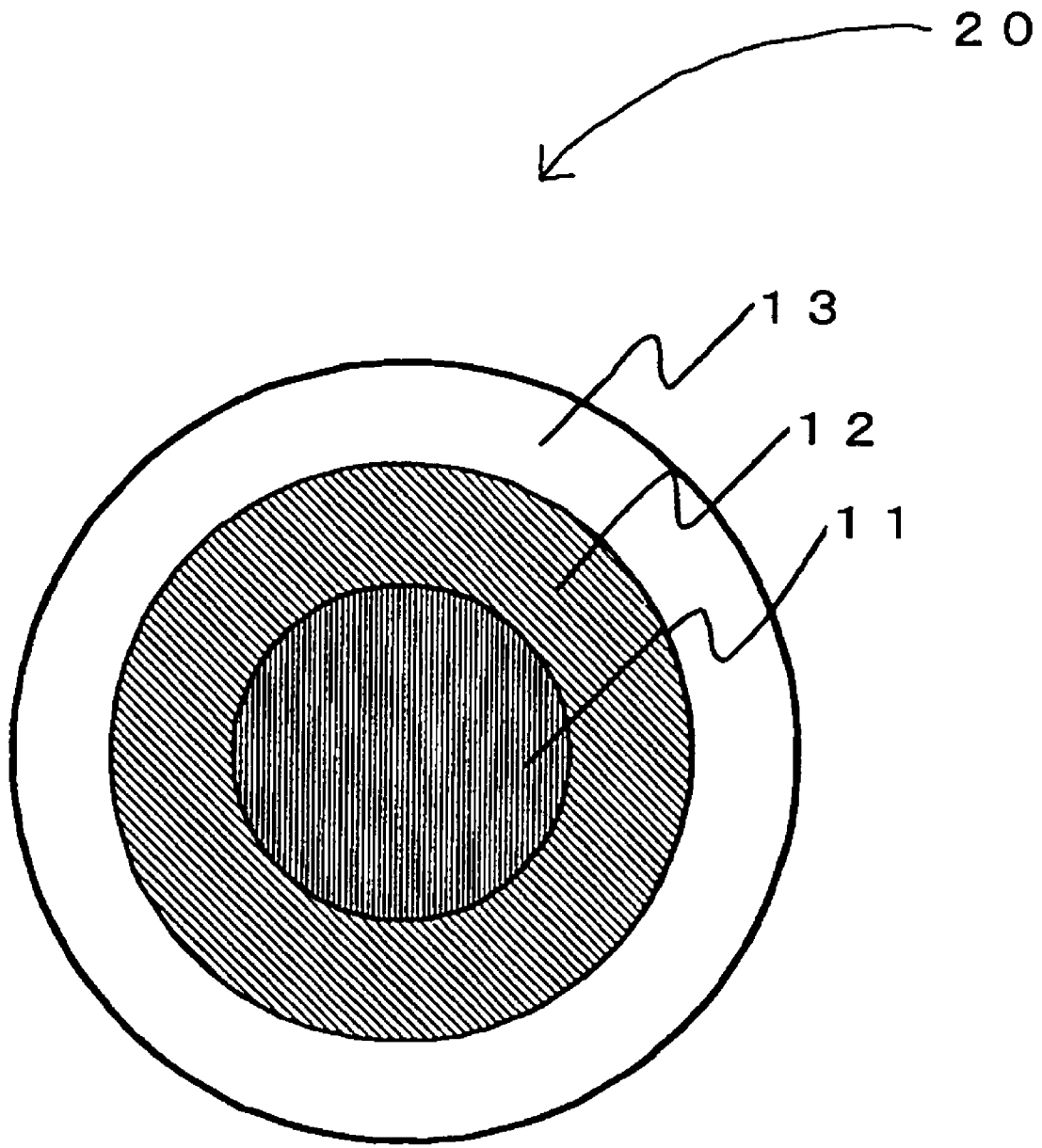
FIG. 2 is a schematic cross-sectional view of the capsule (trilayered structure) of the present invention.

When a capsule filler solution is a lipophilic liquid substance, or a suspension of a lipophilic liquid substance and a powder insoluble therein, a structure of a capsule may be a bilayered structure consisting of a capsule filler solution (1) and a capsule covering film (2), as shown in FIG. 1. Alternatively, when a capsule filler solution is a hydrophilic liquid substance, or a suspension of a hydrophilic liquid substance and a powder insoluble therein, a structure of a capsule may be a trilayered structure consisting of a capsule filler solution (11), an oily substance for isolating a capsule filler solution and a capsule covering solution (12) and a capsule covering film (13), as shown in FIG. 2. The liquid substance for isolation includes, for example, the aforementioned lipophilic liquid substance. This liquid substance for isolation may contain the aforementioned active ingredients and perfumes.

The capsule in accordance with the present invention is particularly suitable in utility of oral ingestion such as foods, drinks, luxury items and medicaments, due to its safety, heat resistance, and high stability. However, the capsule may be also used in entities to be supplied to industrial utility, such as various industrial products (two-component adhesive etc.), samples, agricultural and horticultural drugs, cosmetics, and medical products. A size of a capsule, a kind of a capsule filler solution and the like can be appropriately selected depending on the use purpose and utility.

Examples of the process of producing the capsule of the present invention include a method (adding dropwise method) using a concentric multiple nozzle disclosed in JP-A No. 58-22062 and JP-A No. 59-131356 (this corresponding to U.S. Pat. No. 4,695,466, which is incorporated herein by reference).

In production of a capsule, a capsule covering film solution, a capsule filler solution and, if necessary, a liquid substance for isolating a capsule filler solution and a capsule covering film are prepared in advance. A capsule covering film solution used in preparing a covering film for the capsule of the present invention is prepared by dispersing curdlan and, if necessary, other aforementioned capsule covering film matrix in water (including purified water, ion-exchanged water etc.). A viscosity adjusting agent may be further added to this dispersion to adjust a viscosity of a capsule filler solution in a suitable range for producing a capsule. As such the viscosity adjusting agent, for example, one or two or more kinds selected from the group consisting of alga-derived polysaccharides, vegetable and vegetable seed-derived polysaccharides, microorganism-derived polysaccharides, cellulose viscous substances and starch hydrolysates may be added. Herein, examples of alga-derived polysaccharides include alginic acid and a derivative thereof, agar, carrageenan and the like, examples of vegetable and vegetable seed-derived polysaccharides include pectin, glucomannan, gum arabic, tragacanth gum, karaya gum, guar gum, locustbean gum, tara gum, psyllium seed gum and the like, examples of microorganism-derived polysaccharides include xanthan gum, pullulan, gellan gum and the like, and examples of cellulose viscous substances include methylcellulose, carboxymethylcellulose, crystalline cellulose and the like, which are not limited.

Curdlan is contained in a capsule covering film solution at an amount of 0.1% by weight to 20% by weight, preferably 1 to 10% by weight, further 3 to 6% by weight relative to a total weight of a capsule covering film solution. When curdlan is contained at an amount exceeding 20% by weight, a capsule covering film solution becomes highly viscous, and it becomes difficult to form a capsule. On the other hand, when curdlan is contained at an amount less than 0.1% by weight, a physical strength of the formed capsule is lowered, and a problem is generated in use.

A viscosity adjusting agent is contained in a capsule covering film solution, if necessary. This viscosity adjusting agent is contained at 0 to 15 parts by weight, preferably 0.1 to 10 parts by weight relative to 100 parts by weight of a capsule covering film matrix. A capsule covering film solution is used at a viscosity of 5 mPa·s to 300 mPa·s, preferably 10 mPa·s to 200 mPa·s in a temperature range of 0° C. to 55° C.

A capsule filler solution is used at a viscosity of 10 mPa·s to 300 mPa·s in a temperature range of 0° C. to 55° C. In addition, a liquid substance for isolating a capsule filler solution and a capsule covering film is used at a viscosity of 10 mPa·s to 300 mPa·s in a temperature range of 0° C. to 55° C.

Figure 3:
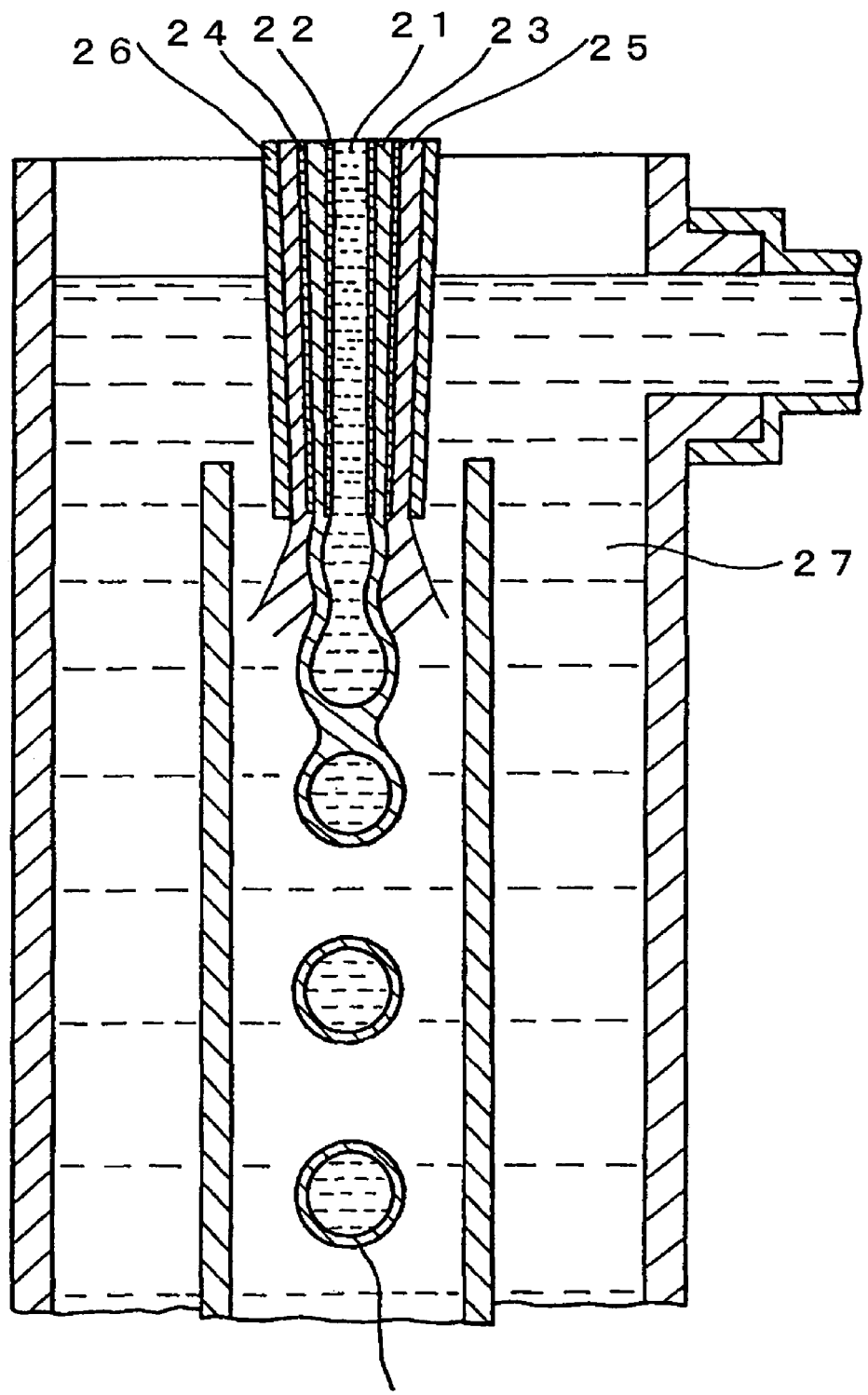
FIG. 3 shows a schematic longitudinal cross-sectional view showing one aspect of a nozzle part of an apparatus for producing the capsule (bilayered structure) of the present invention.

As a process for producing the capsule of a bilayered structure of the present invention, as shown in FIG. 3, the capsule (10) of a bilayered structure of the present invention can be obtained by using a concentric triple nozzle, supplying a capsule filler solution (21) to a first nozzle (22), and a capsule covering film solution (23) to a second nozzle (24), respectively, simultaneously extruding the solutions through each annular hole tip, and releasing this two-phased composite jet into a flowing down heated oil solution (27). Herein, by supplying an oil solution (25) at a temperature lower than that of the aforementioned heated oil solution to a third nozzle (26), and extruding this oil solution together with extrusion of the composite jet, a capsule covering film solution and a heated oil solution can be prevented from rapid gelling by contact at a nozzle tip.

This heated oil solution is typically 80° C. or higher, preferably 85° C. to 120° C., and more preferably 90° C. to 100° C. By heating this oil solution to 80° C. or higher, a capsule excellent in heat resistance can be obtained. As this oil solution, for example, medium chain fatty acid triglyceride (MCT), a vegetable fat or oil (palm oil, sunflower oil, safflower oil, sesame oil, rapeseed oil, grape seed oil, and mixture thereof), liquid paraffin and a mixture thereof can be used.

A temperature of an oil solution which is extruded through a third nozzle is lower than that of the heated oil solution, and is typically 70° C. or lower, preferably 20 to 65° C., and further 25 to 40° C. By extruding an oil solution having a temperature in the aforementioned range simultaneously with extrusion of a composite jet, a capsule covering film solution can be effectively prevented from rapid gelling at a nozzle tip. As this oil solution, the same oil solution as an oil solution which can be used as the heated oil solution can be used. As these oil solutions, the same oil solution may be used, or different oil solutions may be used.

By the aforementioned process, a seamless capsule having a capsule filler solution encapsulated in a capsule covering film solution is formed. Further, a capsule covering film solution is heated in a heated oil solution, curdlan in a capsule covering film solution is gelled to become a high set gel having heat resistance, thereby, the desired capsule can be obtained. This capsule of a bilayered structure can be formed in a range of a diameter of 0.1 to 20 mm, preferably 0.3 to 8 mm, and a covering rate of 1 to 90%, preferably 10 to 50%. Herein, a covering rate is a ratio of a weight of a capsule covering film relative to a weight of a capsule.

Figure 4:
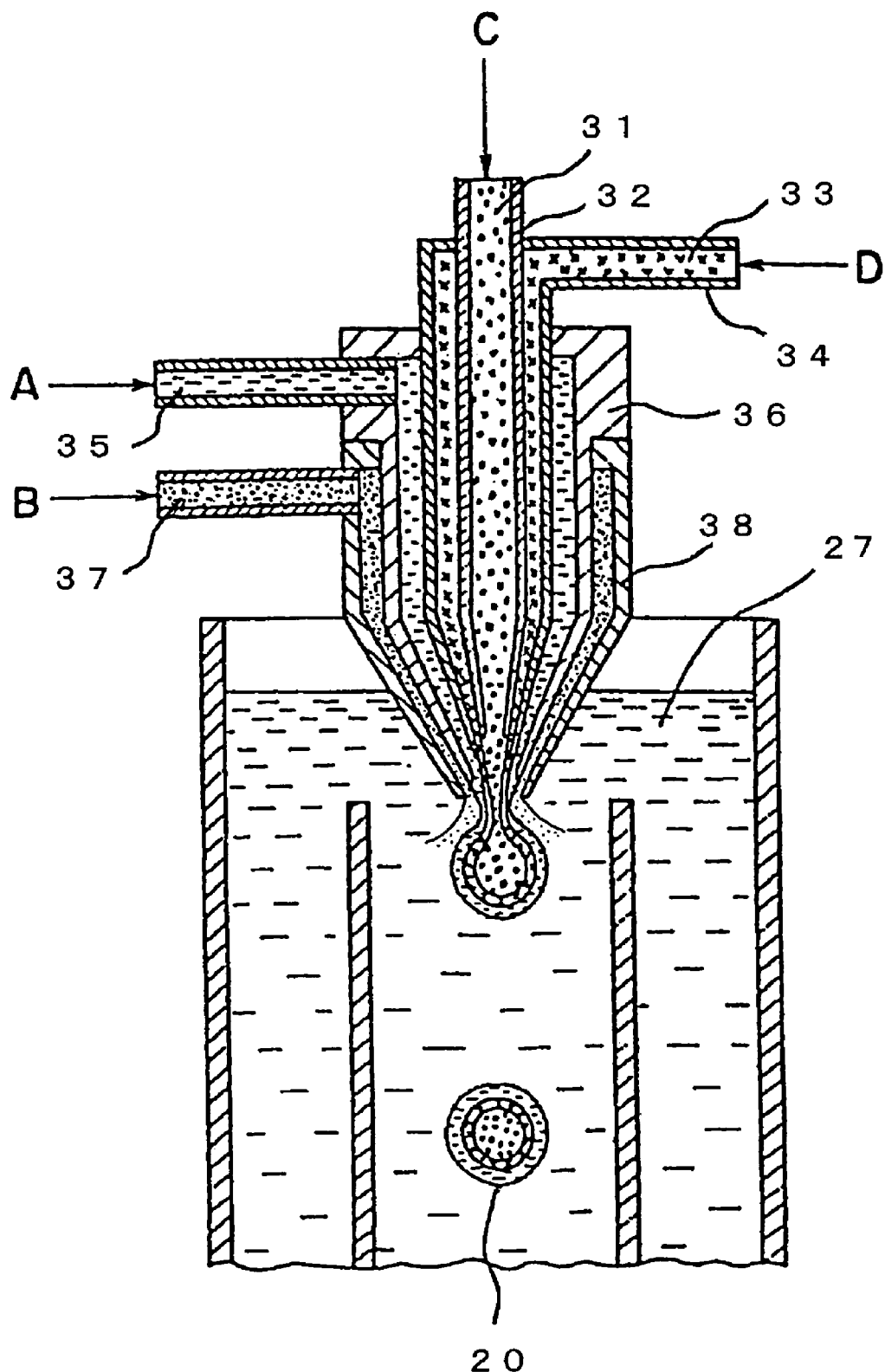
FIG. 4 shows a schematic longitudinal cross-sectional view showing one aspect of a nozzle part of an apparatus for producing the capsule (trilayered structure) of the present invention.

As a process for producing the capsule of a trilayered structure of the present invention, as shown in FIG. 4, the capsule (20) of a trilayered structure in accordance with the present invention can be obtained by using a concentric quadruple nozzle, supplying a capsule filler solution (31) to a first nozzle (32), an oil substance (33) for isolating a capsule filler solution and a capsule covering film to a second nozzle (34), and a capsule covering film solution (35) to a third nozzle (36), respectively, simultaneously extruding the solutions through each annular hole tip, and releasing this three-phased composite jet into a flowing down heated oil solution (27). Herein, by supplying an oil solution (37) at a temperature lower than that of the heated oil solution to a fourth nozzle (38), and extruding this oil solution simultaneously with extrusion of the composite jet, a capsule covering film solution and a heated oil solution can be prevented from rapid gelling by contact at a nozzle tip.

Herein, as an oil solution which is extruded through a fourth nozzle, the same oil solution as an oil solution which is supplied to a third nozzle when a capsule is produced using a concentric triple nozzle as shown in FIG. 3 can be used.

By the aforementioned process, a capsule having the desired heat resistance can be obtained. The capsule of a trilayered structure of the present invention can be formed in a range of a diameter of 0.1 to 20 mm, preferably 0.3 to 8 mm, and a covering rate of 1 to 90%, preferably 10 to 50%.

In the aforementioned process for producing a capsule having a bilayered or trilayered structure, a vibrating means is used to impart suitable vibration to a composite jet stream, thereby, sharpness of a composite jet can be improved, a particle diameter can be uniformized, and capsulation can be facilitated.

The capsule of the present invention is not limited to a bilayered or trilayered structure, but a tetra- or more layered structure may be used. By formulating a capsule into a multilayered structure, a capsule filler solution may be stably contained in a capsule. These can be produced by using a necessary multiple nozzle as described above. In addition, the capsule of the present invention is usually used in the state where 80% by weight or more of water is contained in a capsule covering film. The capsule of the present invention can be, if necessary, subjected to water washing, heating pasteurization or heating sterilization, depending on the use condition. Alternatively, this capsule of the present invention may be dried by a conventional drying method to obtain a heat resistant dried capsule.

EXAMPLES

The present invention will be explained in more detail by way of following Examples. However, the present invention is not limited to these examples.

Example 1

Medium chain fatty acid triglyceride (MCT) was mixed into vitamin E to prepare a capsule filler solution, and a seamless capsule in which this content is encapsulated with a capsule covering film containing curdlan as a covering film matrix was prepared. First, 20 parts by weight of MCT (medium chain fatty acid triglyceride) was mixed into 80 parts by weight of vitamin E (dl-α-tocopherol acetate) to prepare 100 parts by weight of a capsule filler solution. Then, 4.0 parts by weight of curdlan, 0.1 part by weight of xanthan gum as a viscosity adjusting agent, and 95.9 parts by weight of purified water were uniformly mixed to prepare a curdlan dispersion, which was used as a capsule covering film solution. Using a concentric triple nozzle, these were simultaneously extruded as follows: A capsule filler solution was extruded through an inner nozzle (first nozzle), a capsule covering film solution was extruded through an external nozzle (second nozzle), and a vegetable oil (MCT) at 40° C. was extruded through an outermost nozzle (third nozzle) into a flowing down 100° C. vegetable oil (MCT), to obtain a seamless capsule of a bilayered structure having a particle diameter of 2 mm.

These capsules were dispersed and immersed in purified water, an aqueous citric acid solution (pH 3) and an aqueous NaOH solution (pH 11), each was sealed in a glass bottle, the glass bottle was sterilization-treated in an autoclave at 121° C. for 15 minutes. The state of the capsule after treatment was assessed. Results thereof are used in Table 1.

Comparative Example 1

Twenty parts by weight of MCT (medium chain fatty acid triglyceride) was mixed into 80 parts by weight of vitamin E (dl-α-tocopherol acetate) to prepare 100 parts by weight of a capsule filler solution. Then, 2 parts by weight of agar and 98 parts by weight of purified water were mixed, and heated and dissolved at 100° C. to obtain a capsule covering film solution. Using a concentric double nozzle, these were simultaneously extruded as follows: A capsule filler solution was extruded through an inner nozzle (first nozzle), and a capsule covering film solution was extruded through an outer nozzle (second nozzle) into a flowing down 10° C. vegetable oil (MCT) to obtain a seamless capsule of a bilayered structure having a particle diameter of 2 mm.

As in Example 1, these capsules were dispersed and immersed in purified water, an aqueous citric acid solution (pH 3) and an aqueous NaOH solution (pH 11), each was sealed in a glass bottle, and the glass bottle was sterilization-treated in an autoclave at 121° C. for 15 minutes. The state of the capsule after treatment was assessed. Results thereof are shown in Table 1.

TABLE 1

| Sample | Purified water immersion | Aqueous citric acid solution (pH 3) immersion | Aqueous NaOH solution (pH 11) immersion |
|---|---|---|---|
| Example 1 | Presence of covering film retaining elasticity | Covering film holding, slightly shrank, hard, slightly elastic | Covering film holding, slightly swollen, elastic |
| Comparative Example 1 | Covering film was dissolved No shape | Covering film was dissolved No shape | Covering film was dissolved No shape |

As shown in Table 1, the capsule of the present invention is excellent in heat resistance, and is excellent in acid resistance, and alkali resistance. In addition, since the capsule has sufficient elasticity, it is also excellent in a physical strength. Further, the capsule also has excellent freezing resistance, and transparency which are characteristic of curdlan.

INDUSTRIAL APPLICABILITY

The capsule of the present invention is a capsule which is excellent in heat resistance, further is excellent in physical strength, transparency, acid resistance, alkali resistance and freezing resistance, and has a non-protein covering film. The capsule of the present invention encapsulating a capsule filler solution can be added to liquid foods such as drinks and the like, cooked processed foods such as retort foods and the like, and baked confectionary.

The invention claimed is:

1. A heat resistant capsule comprising a capsule covering film and a capsule filler solution encapsulated therein, wherein curdlan is used as a capsule covering film matrix of the capsule covering film and contained at an amount of 80% by weight or more relative to a total weight of the capsule covering film matrix.

2. A heat resistant capsule, characterized in that a capsule filler solution is encapsulated in a capsule covering film via a liquid substance for isolating the capsule filler solution and the capsule covering film, wherein curdlan is used as a capsule covering film matrix of the capsule covering film and contained at an amount of 80% by weight or more relative to a total weight of the capsule covering film matrix.

3. A process for producing a heat resistant capsule, comprising using a first nozzle, a second nozzle and a third nozzle having a sequentially increasing radius, which are disposed concentrically, simultaneously extruding a capsule filler solution through the first nozzle, a capsule covering film solution through the second nozzle, and an oil solution through the third nozzle to form a composite jet, and releasing the composite jet into a heated oil solution, wherein the capsule covering film solution contains curdlan, a temperature of the oil solution which is extruded through the third nozzle is lower than that of the heated oil solution, the oil solution has a temperature of 20 to 65° C. and the heated oil solution has a temperature of 80° C. or more.

4. A process for producing a heat resistant capsule, comprising using a first nozzle, a second nozzle, a third nozzle and a fourth nozzle having a sequentially increasing radius, which are disposed concentrically, simultaneously extruding a capsule filler solution through the first nozzle, a liquid substance for isolating the capsule filler solution and a capsule covering film through the second nozzle, a capsule covering film solution through the third nozzle, and an oil solution through the fourth nozzle to form a composite jet, and releasing the composite jet into a heated oil solution, wherein the capsule covering film solution contains curdlan, and a temperature of the oil solution which is extruded through the fourth nozzle is lower than that of the heated oil solution, the oil solution has a temperature of 20 to 65° C. and the heated oil solution has a temperature of 80° C. or more.

5. The process according to claim 3, wherein curdlan is contained in the capsule covering film solution at an amount of 0.1 to 20% by weight relative to a total weight of the capsule covering film solution.

6. The process according to claim 3, wherein the capsule covering film solution further contains a viscosity adjusting agent.

7. The process according to claim 6, wherein the viscosity adjusting agent contains one or more kinds selected from the group consisting of alga-derived polysaccharides, plant and plant seed-derived polysaccharides, microorganism-derived polysaccharides, cellulose viscous substances and starch hydrolysates.

8. The process according to claim 4, wherein curdlan is contained in the capsule covering film solution at an amount of 0.1 to 20% by weight relative to a total weight of the capsule covering film solution.

9. The process according to claim 4, wherein the capsule covering film solution further contains a viscosity adjusting agent.

* * * * *